US012688304B2

(12) United States Patent
Zhang et al.

(10) Patent No.: US 12,688,304 B2
(45) Date of Patent: Jul. 21, 2026

(54) METHOD, SYSTEM, AND COMPUTER PROGRAM PRODUCT FOR PROVIDING AN ANALYSIS FRAMEWORK FOR CYBERSECURITY THREATS USING A HYBRID TEMPORAL GRAPH NEURAL NETWORK

(71) Applicant: Visa International Service Association, San Francisco, CA (US)

(72) Inventors: Yimin Zhang, Rockville, MD (US); Mohit Sharma, Ashburn, VA (US); Wazeed Baba Shirdi, Herndon, VA (US)

(73) Assignee: Visa International Service Association, San Francisco, CA (US)

( * ) Notice: Subject to any disclaimer, the term of this patent is extended or adjusted under 35 U.S.C. 154(b) by 75 days.

(21) Appl. No.: 18/763,023

(22) Filed: Jul. 3, 2024

(65) Prior Publication Data

US 2026/0010636 A1     Jan. 8, 2026

(51) Int. Cl.
*G06F 21/57*          (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

2017/0063900 A1      3/2017  Muddu et al.
2018/0349606 A1*  12/2018  Zhang ................... G06N 20/00

2019/0081967 A1*   3/2019  Balabine ............. H04L 63/1425
2021/0209229 A1      7/2021  Wu et al.
2022/0159025 A1*   5/2022  Niv ......................... G06F 9/546
2022/0405580 A1*  12/2022  Zheng ................ G06F 18/2137
2023/0090205 A1*   3/2023  Yehezkel ............ H04L 63/1425
                                                                                726/23
2024/0112015 A1*   4/2024  Inzelberg ............... G06N 3/045
2024/0333743 A1*  10/2024  Bazalgette .......... H04L 63/1416

FOREIGN PATENT DOCUMENTS

CN          110737890 A  *  1/2020  .......... G06F 21/556

OTHER PUBLICATIONS

Le, "A Machine Learning Based Framework for User-Centered Insider Threat Detection", Aug. 2021, 156 pp.

* cited by examiner

*Primary Examiner* — Fatoumata Traore
(74) *Attorney, Agent, or Firm* — The Webb Law Firm

(57)          ABSTRACT

Methods, systems, and computer program products are provided for an analysis framework for cybersecurity threats in a network. A method may include receiving data associated with network activity of each user of a plurality of users during a time interval, generating one or more entity feature embeddings for each user based on the data associated with network activity of that user, generating a plurality of user behavior embeddings for the plurality of users based on one or more outputs of a temporal graph neural network (GNN) machine learning model, and calculating a user risk score for a first user based on the plurality of user behavior embeddings, wherein the user risk score represents a measurement of a risk associated with behavior of the first user to cause damage to a network.

20 Claims, 9 Drawing Sheets

100

200

202 Receive data associated with network activity of a plurality of users

204 Generate one or more entity feature embeddings for each user

206 Generate a graph structure

208 Generate a plurality of user behavior embeddings for the plurality of users using a temporal graph neural network (GNN) machine learning model 210 Calculate a user risk score for a user

300

User Risk Score

345
Perform a threat prevention procedure with regard to a network account of the user based on the user risk score for the user Graph Analysis System 102

Figure 3E:
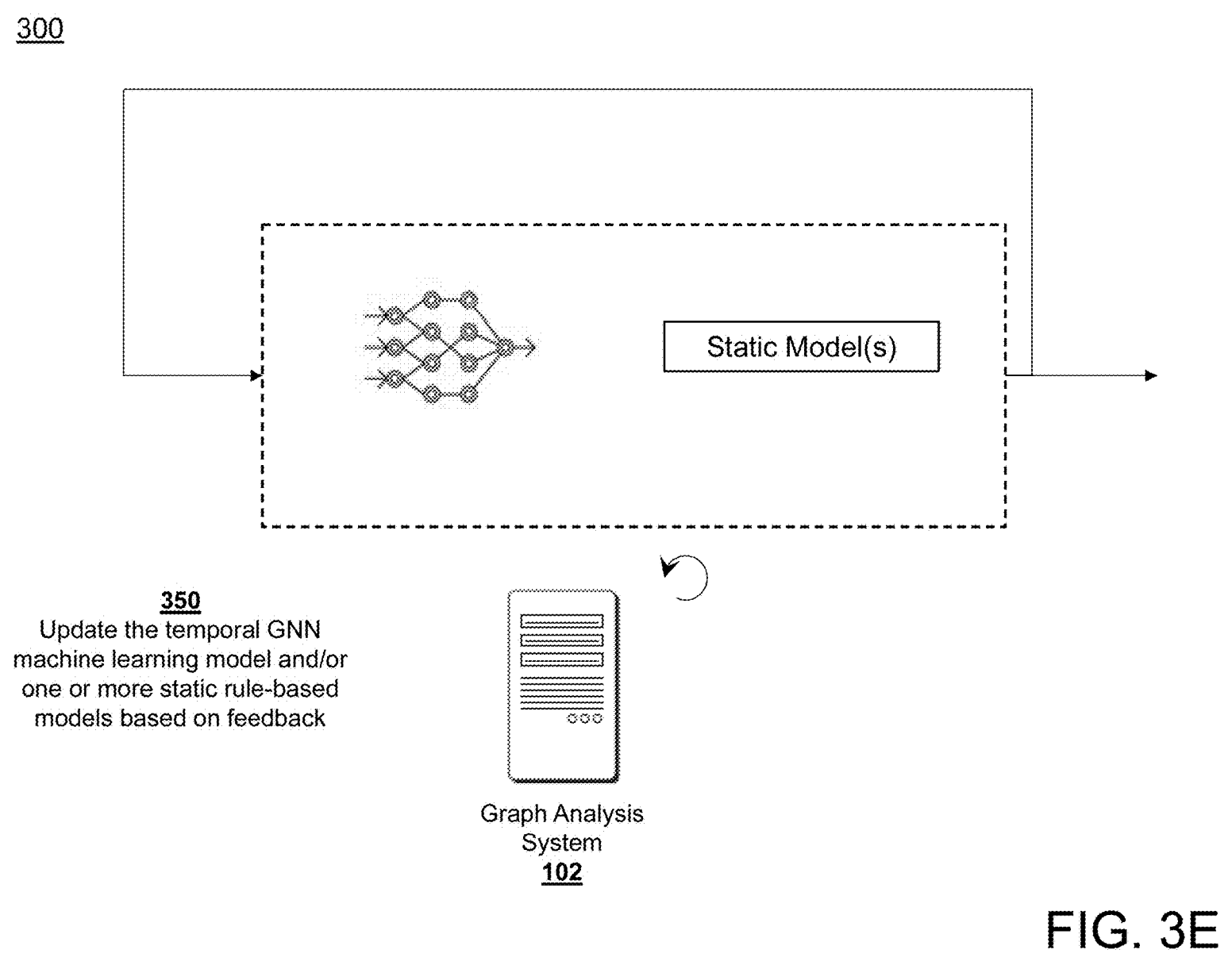

300

Static Model(s)

Graph Analysis
System
102

350
Update the temporal GNN
machine learning model and/or
one or more static rule-based
models based on feedback

METHOD, SYSTEM, AND COMPUTER PROGRAM PRODUCT FOR PROVIDING AN ANALYSIS FRAMEWORK FOR CYBERSECURITY THREATS USING A HYBRID TEMPORAL GRAPH NEURAL NETWORK

BACKGROUND

1. Technical Field

This disclosure relates generally to detecting cybersecurity threats and, in some non-limiting embodiments or aspects, to systems, methods, and computer program products for providing an analysis framework of cybersecurity threats using a hybrid temporal graph neural network.

2. Technical Considerations

A threat actor (e.g., a bad actor, malicious actor, etc.) may refer to a person or a group of people that take part in a malicious action (e.g., an attack, such as a cyberattack) that is intended to cause harm to computers, devices, systems, or networks of a person or an organization of any type or size. In some instances, threat actors may engage in cyber related offenses to exploit open vulnerabilities and disrupt operations. An advanced persistent threat (APT) may refer to a stealthy threat actor, which may include a state or state-sponsored group, which gains unauthorized access to a computer network and remains undetected for an extended period.

In some instances, an APT may include non-state-sponsored groups conducting targeted intrusions for specific goals. As an example, an APT may include a threat actor that is positioned inside an organization. As successful data exfiltration can cause severe damages and/or a huge cost to the organization, detecting such an insider threat actor, hiding within the boundaries of an enterprise network, has drawn increasing attention recently. In order to detect a threat actor, an entity may leverage a scoring mechanism to provide alerts generated from multiple detectors (e.g., rule-based detectors).

However, such an approach may be inefficient or ineffective as individual detectors may have high false positive rates and/or are static in nature. Further, most insider attacks span a long period of time, which may not be detectable by an individual detector, particularly if the detector is static in nature. In addition, providing alerts may lack context, such as peer grouping analysis, to accurately adjust risk scores of individual actors. Lastly, some solutions do not involve the use of feedback to continuously improve performance.

SUMMARY

Accordingly, provided are improved systems, methods, and computer program products for providing an analysis framework for cybersecurity threats in a network using a hybrid temporal graph neural network.

According to non-limiting embodiments or aspects, provided is a computer-implemented method for providing an analysis framework for cybersecurity threats in a network using a hybrid temporal graph neural network that includes receiving, with at least one processor, data associated with network activity of each user of a plurality of users during a time interval; generating, with at least one processor, one or more entity feature embeddings for each user based on the data associated with network activity of that user; generating, with at least one processor, a plurality of user behavior embeddings for the plurality of users based on one or more outputs of a temporal graph neural network (GNN) machine learning model; and calculating, with at least one processor, a user risk score for a first user based on the plurality of user behavior embeddings, wherein the user risk score represents a measurement of a risk associated with behavior of the first user to cause damage to a network.

In some non-limiting embodiments or aspects, the method further comprises determining a plurality of peer groups for the plurality of users based on the plurality of user behavior embeddings; and determining, based on the plurality of peer groups for the plurality of users, at least one of the following: a metric associated with a peer grouping of the first user; a metric associated with behavioral anomalies of the first user; a metric associated with one or more results of one or more static rule-based models for the user; or any combination thereof; wherein calculating the user risk score for the user comprises: calculating the user risk score for the first user based on at least one of the following: the metric associated with a peer grouping of the first user; the metric associated with behavioral anomalies of the first user; the metric associated with one or more results of one or more static rule-based models for the user; or any combination thereof.

In some non-limiting embodiments or aspects, the method further comprises generating the temporal GNN machine learning model based on the one or more entity feature embeddings for each user of the plurality of users.

In some non-limiting embodiments or aspects, the method further comprises determining whether to perform a threat prevention activity with regard to a network account of the user based on the user risk score for the user.

In some non-limiting embodiments or aspects, the data associated with network activity of each user of the plurality of users comprises categorical feature data associated with network activity of each user of the plurality of users, and generating the one or more entity feature embeddings for each user comprises: generating one or more entity feature embeddings of the one or more entity feature embeddings for each user based on an output of a natural language processing (NLP) machine learning model, wherein the output is based on an input that comprises the categorical feature data associated with network activity of that user.

In some non-limiting embodiments or aspects, the method further comprises generating data associated with a result of a static rule-based model for a user, wherein the result is determined based on the data associated with network activity of the user provided as an input to the static rule-based model; and updating the temporal GNN machine learning model based on the data associated with the result of the static rule-based model.

In some non-limiting embodiments or aspects, receiving the data associated with network activity of each user of the plurality of users during a time interval comprises: receiving data associated with a plurality of audit logs for each user of the plurality of users, wherein the plurality of audit logs are associated with network activity of a user during a time interval; wherein generating the one or more entity feature embeddings for each user comprises: generating a plurality of entity feature embeddings for each user based on the data associated with the plurality of audit logs for that user, wherein each entity feature embedding of the plurality of entity feature embeddings corresponds to each audit log of the plurality of audit logs.

According to non-limiting embodiments or aspects, provided is a system for providing an analysis framework for cybersecurity threats in a network using a hybrid temporal graph neural network that includes at least one processor configured to receive data associated with network activity of each user of a plurality of users during a time interval; generate one or more entity feature embeddings for each user based on the data associated with network activity of that user; generate a plurality of user behavior embeddings for the plurality of users based on one or more outputs of a temporal graph neural network (GNN) machine learning model; and calculate a user risk score for a first user based on the plurality of user behavior embeddings, wherein the user risk score represents a measurement of a risk associated with behavior of the first user to cause damage to a network.

In some non-limiting embodiments or aspects, the at least one processor is further configured to: determine a plurality of peer groups for the plurality of users based on the plurality of user behavior embeddings; and determine, based on the plurality of peer groups for the plurality of users, at least one of the following: a metric associated with a peer grouping of the first user; a metric associated with behavioral anomalies of the first user; a metric associated with one or more results of one or more static rule-based models for the user; or any combination thereof; wherein, when calculating the user risk score for the user, the at least one processor is configured to: calculate the user risk score for the first user based on at least one of the following: the metric associated with a peer grouping of the first user; the metric associated with behavioral anomalies of the first user; the metric associated with one or more results of one or more static rule-based models for the user; or any combination thereof.

In some non-limiting embodiments or aspects, the at least one processor is further configured to: generate the temporal GNN machine learning model based on the one or more entity feature embeddings for each user of the plurality of users.

In some non-limiting embodiments or aspects, the at least one processor is further configured to: determine whether to perform a threat prevention activity with regard to a network account of the user based on the user risk score for the user.

In some non-limiting embodiments or aspects, the data associated with network activity of each user of the plurality of users comprises categorical feature data associated with network activity of each user of the plurality of users, and wherein, when generating the one or more entity feature embeddings for each user, the at least one processor is configured to: generate one or more entity feature embeddings of the one or more entity feature embeddings for each user based on an output of a natural language processing (NLP) machine learning model, wherein the output is based on an input that comprises the categorical feature data associated with network activity of that user.

In some non-limiting embodiments or aspects, the at least one processor is further configured to: generate data associated with a result of a static rule-based model for a user, wherein the result is determined based on the data associated with network activity of the user provided as an input to the static rule-based model; and update the temporal GNN machine learning model based on the data associated with the result of the static rule-based model.

In some non-limiting embodiments or aspects, when receiving the data associated with network activity of each user of the plurality of users during a time interval, the at least one processor is configured to: receive data associated with a plurality of audit logs for each user of the plurality of users, wherein the plurality of audit logs are associated with network activity of a user during a time interval; wherein, when generating the one or more entity feature embeddings for each user, the at least one processor is configured to: generate a plurality of entity feature embeddings for each user based on the data associated with the plurality of audit logs for that user, wherein each entity feature embedding of the plurality of entity feature embeddings corresponds to each audit log of the plurality of audit logs.

According to non-limiting embodiments or aspects, provided is computer program product for providing an analysis framework for cybersecurity threats in a network using a hybrid temporal graph neural network that includes at least one non-transitory computer-readable medium including program instructions that, when executed by at least one processor, cause the at least one processor to receive data associated with network activity of each user of a plurality of users during a time interval; generate one or more entity feature embeddings for each user based on the data associated with network activity of that user; generate a plurality of user behavior embeddings for the plurality of users based on one or more outputs of a temporal graph neural network (GNN) machine learning model; and calculate a user risk score for a first user based on the plurality of user behavior embeddings, wherein the user risk score represents a measurement of a risk associated with behavior of the first user to cause damage to a network.

In some non-limiting embodiments or aspects, the program instructions further cause the at least one processor to: determine a plurality of peer groups for the plurality of users based on the plurality of user behavior embeddings; and determine, based on the plurality of peer groups for the plurality of users, at least one of the following: a metric associated with a peer grouping of the first user; a metric associated with behavioral anomalies of the first user; a metric associated with one or more results of one or more static rule-based models for the user; or any combination thereof; wherein, the program instructions that cause the at least one processor to calculate the user risk score for the user, cause the at least one processor to: calculate the user risk score for the first user based on at least one of the following: the metric associated with a peer grouping of the first user; the metric associated with behavioral anomalies of the first user; the metric associated with one or more results of one or more static rule-based models for the user; or any combination thereof.

In some non-limiting embodiments or aspects, the program instructions further cause the at least one processor to: generate the temporal GNN machine learning model based on the one or more entity feature embeddings for each user of the plurality of users.

In some non-limiting embodiments or aspects, the program instructions further cause the at least one processor to: determine whether to perform a threat prevention activity with regard to a network account of the user based on the user risk score for the user.

In some non-limiting embodiments or aspects, the data associated with network activity of each user of the plurality of users comprises categorical feature data associated with network activity of each user of the plurality of users, and wherein, the program instructions that cause the at least one processor to generate the one or more entity feature embeddings for each user, cause the at least one processor to: generate one or more entity feature embeddings of the one or more entity feature embeddings for each user based on an output of a natural language processing (NLP) machine learning model, wherein the output is based on an input that comprises the categorical feature data associated with network activity of that user.

In some non-limiting embodiments or aspects, the program instructions further cause the at least one processor to: generate data associated with a result of a static rule-based model for a user, wherein the result is determined based on the data associated with network activity of the user provided as an input to the static rule-based model; and update the temporal GNN machine learning model based on the data associated with the result of the static rule-based model.

Further non-limiting embodiments or aspects are set forth in the following numbered clauses:

Clause 1: A method, comprising: receiving, with at least one processor, data associated with network activity of each user of a plurality of users during a time interval; generating, with at least one processor, one or more entity feature embeddings for each user based on the data associated with network activity of that user; generating, with at least one processor, a plurality of user behavior embeddings for the plurality of users based on one or more outputs of a temporal graph neural network (GNN) machine learning model; and calculating, with at least one processor, a user risk score for a first user based on the plurality of user behavior embeddings, wherein the user risk score represents a measurement of a risk associated with behavior of the first user to cause damage to a network.

Clause 2: The method of clause 1, further comprising: determining a plurality of peer groups for the plurality of users based on the plurality of user behavior embeddings; and determining, based on the plurality of peer groups for the plurality of users, at least one of the following: a metric associated with a peer grouping of the first user; a metric associated with behavioral anomalies of the first user; a metric associated with one or more results of one or more static rule-based models for the user; or any combination thereof; wherein calculating the user risk score for the user comprises: calculating the user risk score for the first user based on at least one of the following: the metric associated with a peer grouping of the first user; the metric associated with behavioral anomalies of the first user; the metric associated with one or more results of one or more static rule-based models for the user; or any combination thereof.

Clause 3: The method of clause 1 or 2, further comprising: generating the temporal GNN machine learning model based on the one or more entity feature embeddings for each user of the plurality of users.

Clause 4: The method of any of clauses 1-3, further comprising: determining whether to perform a threat prevention activity with regard to a network account of the user based on the user risk score for the user.

Clause 5: The method of any of clauses 1-4, wherein the data associated with network activity of each user of the plurality of users comprises categorical feature data associated with network activity of each user of the plurality of users, and wherein generating the one or more entity feature embeddings for each user comprises: generating one or more entity feature embeddings of the one or more entity feature embeddings for each user based on an output of a natural language processing (NLP) machine learning model, wherein the output is based on an input that comprises the categorical feature data associated with network activity of that user.

Clause 6: The method of any of clauses 1-5, further comprising: generating data associated with a result of a static rule-based model for a user, wherein the result is determined based on the data associated with network activity of the user provided as an input to the static rule-based model; and updating the temporal GNN machine learning model based on the data associated with the result of the static rule-based model.

Clause 7: The method of any of clauses 1-6, wherein receiving the data associated with network activity of each user of the plurality of users during a time interval comprises: receiving data associated with a plurality of audit logs for each user of the plurality of users, wherein the plurality of audit logs are associated with network activity of a user during a time interval; wherein generating the one or more entity feature embeddings for each user comprises: generating a plurality of entity feature embeddings for each user based on the data associated with the plurality of audit logs for that user, wherein each entity feature embedding of the plurality of entity feature embeddings corresponds to each audit log of the plurality of audit logs.

Clause 8: A system, comprising: at least one processor configured to: receive data associated with network activity of each user of a plurality of users during a time interval; generate one or more entity feature embeddings for each user based on the data associated with network activity of that user; generate a plurality of user behavior embeddings for the plurality of users based on one or more outputs of a temporal graph neural network (GNN) machine learning model; and calculate a user risk score for a first user based on the plurality of user behavior embeddings, wherein the user risk score represents a measurement of a risk associated with behavior of the first user to cause damage to a network.

Clause 9: The system of clause 8, wherein the at least one processor is further configured to: determine a plurality of peer groups for the plurality of users based on the plurality of user behavior embeddings; and determine, based on the plurality of peer groups for the plurality of users, at least one of the following: a metric associated with a peer grouping of the first user; a metric associated with behavioral anomalies of the first user; a metric associated with one or more results of one or more static rule-based models for the user; or any combination thereof; wherein, when calculating the user risk score for the user, the at least one processor is configured to: calculate the user risk score for the first user based on at least one of the following: the metric associated with a peer grouping of the first user; the metric associated with behavioral anomalies of the first user; the metric associated with one or more results of one or more static rule-based models for the user; or any combination thereof.

Clause 10: The system of clause 8 or 9, wherein the at least one processor is further configured to: generate the temporal GNN machine learning model based on the one or more entity feature embeddings for each user of the plurality of users.

Clause 11: The system of any of clauses 8-10, wherein the at least one processor is further configured to: determine whether to perform a threat prevention activity with regard to a network account of the user based on the user risk score for the user.

Clause 12: The system of any of clauses 8-11, wherein the data associated with network activity of each user of the plurality of users comprises categorical feature data associated with network activity of each user of the plurality of users, and wherein, when generating the one or more entity feature embeddings for each user, the at least one processor is configured to: generate one or more entity feature embeddings of the one or more entity feature embeddings for each user based on an output of a natural language processing (NLP) machine learning model, wherein the output is based on an input that comprises the categorical feature data associated with network activity of that user.

Clause 13: The system of any of clauses 8-12, wherein the at least one processor is further configured to: generate data associated with a result of a static rule-based model for a user, wherein the result is determined based on the data associated with network activity of the user provided as an input to the static rule-based model; and update the temporal GNN machine learning model based on the data associated with the result of the static rule-based model.

Clause 14: The system of any of clauses 8-13, wherein, when receiving the data associated with network activity of each user of the plurality of users during a time interval, the at least one processor is configured to: receive data associated with a plurality of audit logs for each user of the plurality of users, wherein the plurality of audit logs are associated with network activity of a user during a time interval; wherein, when generating the one or more entity feature embeddings for each user, the at least one processor is configured to: generate a plurality of entity feature embeddings for each user based on the data associated with the plurality of audit logs for that user, wherein each entity feature embedding of the plurality of entity feature embeddings corresponds to each audit log of the plurality of audit logs.

Clause 15: A computer program product comprising at least one non-transitory computer-readable medium including program instructions that, when executed by at least one processor, cause the at least one processor to: receive data associated with network activity of each user of a plurality of users during a time interval; generate one or more entity feature embeddings for each user based on the data associated with network activity of that user; generate a plurality of user behavior embeddings for the plurality of users based on one or more outputs of a temporal graph neural network (GNN) machine learning model; and calculate a user risk score for a first user based on the plurality of user behavior embeddings, wherein the user risk score represents a measurement of a risk associated with behavior of the first user to cause damage to a network.

Clause 16: The computer program product of clause 15, wherein the program instructions further cause the at least one processor to: determine a plurality of peer groups for the plurality of users based on the plurality of user behavior embeddings; and determine, based on the plurality of peer groups for the plurality of users, at least one of the following: a metric associated with a peer grouping of the first user; a metric associated with behavioral anomalies of the first user; a metric associated with one or more results of one or more static rule-based models for the user; or any combination thereof; wherein, the program instructions that cause the at least one processor to calculate the user risk score for the user, cause the at least one processor to: calculate the user risk score for the first user based on at least one of the following: the metric associated with a peer grouping of the first user; the metric associated with behavioral anomalies of the first user; the metric associated with one or more results of one or more static rule-based models for the user; or any combination thereof.

Clause 17: The computer program product of clause 15 or 16, wherein the program instructions further cause the at least one processor to: generate the temporal GNN machine learning model based on the one or more entity feature embeddings for each user of the plurality of users.

Clause 18: The computer program product of any of clauses 15-17, wherein the program instructions further cause the at least one processor to: determine whether to perform a threat prevention activity with regard to a network account of the user based on the user risk score for the user.

Clause 19: The computer program product of any of clauses 15-18, wherein the data associated with network activity of each user of the plurality of users comprises categorical feature data associated with network activity of each user of the plurality of users, and wherein, the program instructions that cause the at least one processor to generate the one or more entity feature embeddings for each user, cause the at least one processor to: generate one or more entity feature embeddings of the one or more entity feature embeddings for each user based on an output of a natural language processing (NLP) machine learning model, wherein the output is based on an input that comprises the categorical feature data associated with network activity of that user.

Clause 20: The computer program product of any of clauses 15-19, wherein the program instructions further cause the at least one processor to: generate data associated with a result of a static rule-based model for a user, wherein the result is determined based on the data associated with network activity of the user provided as an input to the static rule-based model; and update the temporal GNN machine learning model based on the data associated with the result of the static rule-based model.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure.

BRIEF DESCRIPTION OF THE DRAWINGS

Additional advantages and details are explained in greater detail below with reference to the non-limiting, exemplary embodiments that are illustrated in the accompanying schematic figures, in which:

FIGS. 3A-3E are diagrams of an exemplary implementation of the present disclosure for providing an analysis framework for cybersecurity threats in a network using a hybrid temporal graph neural network, according to some non-limiting embodiments or aspects;

DETAILED DESCRIPTION

Figure 1:
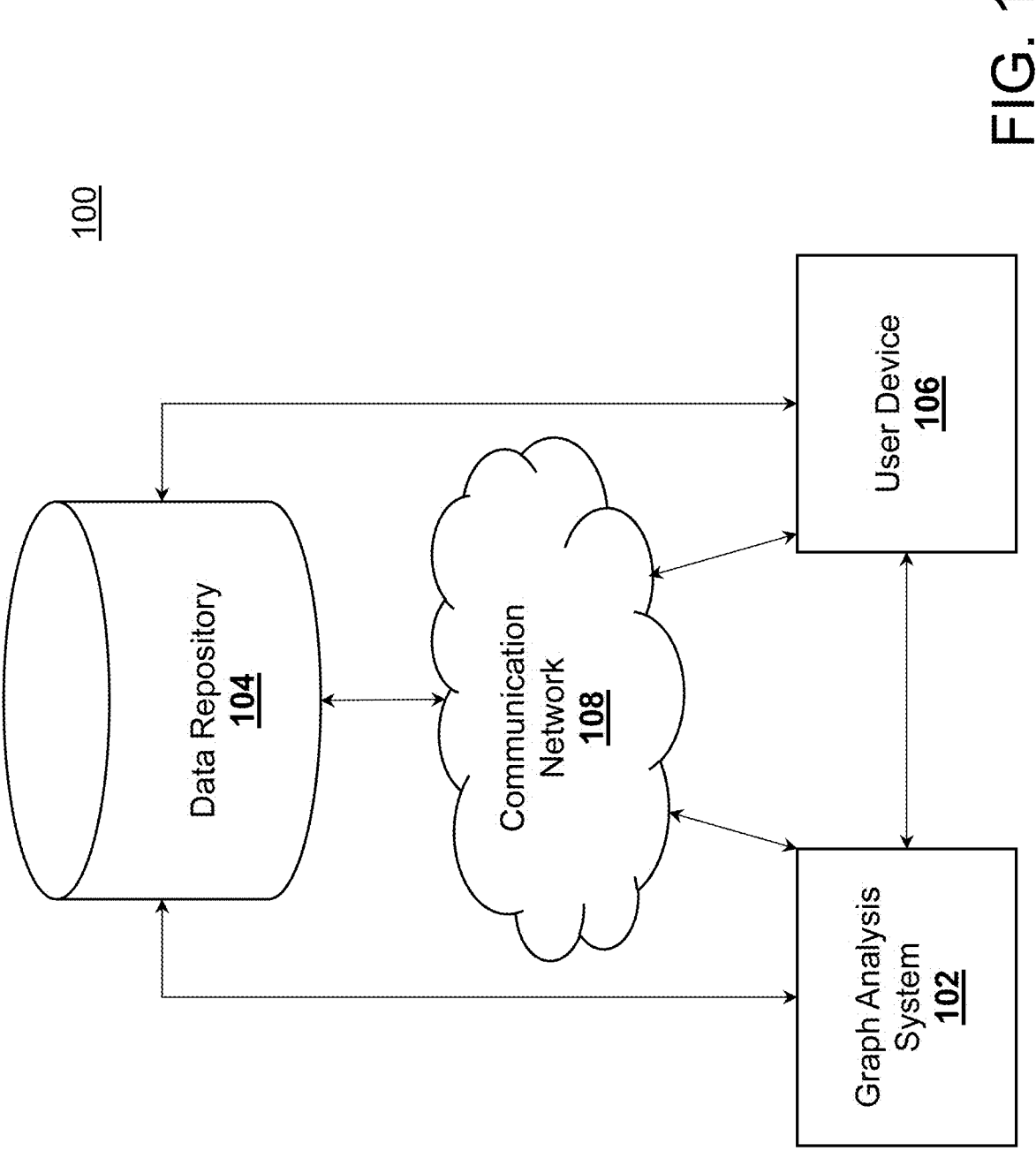
FIG. 1 is a schematic diagram of a system for providing an analysis framework for cybersecurity threats in a network using a hybrid temporal graph neural network, according to non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects of the disclosed subject matter. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor the compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

Non-limiting embodiments or aspects of the present disclosure are directed to methods, systems, and computer program products for providing an analysis framework for cybersecurity threats in a network using a hybrid temporal graph neural network (GNN). In some non-limiting embodiments or aspects, the present disclosure provides for receiving data associated with network activity for each user of a plurality of users during a time interval, generating one or more entity feature embeddings for each user based on the data associated with network activity for that user, generating a plurality of user behavior embeddings for the plurality of users based on one or more outputs of a temporal GNN machine learning model; and calculating a user risk score for a first user based on the plurality of user behavior embeddings, wherein the user risk score represents a measurement of a risk associated with behavior of the first user to cause damage to a network.

In some non-limiting embodiments or aspects, receiving the data associated with network activity for each user of the plurality of users during a time interval includes receiving data associated with a plurality of audit logs for each user of the plurality of users, where the plurality of audit logs are associated with network activity of a user during a time interval, and generating the one or more entity feature embeddings for each user includes generating a plurality of entity feature embeddings for each user based on the data associated with the plurality of audit logs for that user, wherein each entity feature embedding of the plurality of entity feature embeddings corresponds to each audit log of the plurality of audit logs.

In some non-limiting embodiments or aspects, the present disclosure provides for determining a plurality of peer groups for the plurality of users based on a plurality of user behavior embeddings, and determining, based on the plurality of peer groups for the plurality of users, at least one of the following: a metric associated with a peer grouping of the first user, a metric associated with behavioral anomalies of the first user, a metric associated with one or more results of one or more static rule-based models for the user, or any combination thereof, and wherein calculating the user risk score for the user includes calculating the user risk score for the first user based on at least one of the following: the metric associated with a peer grouping of the first user, the metric associated with behavioral anomalies of the first user, or any combination thereof.

In some non-limiting embodiments or aspects, the present disclosure provides for generating the temporal GNN machine learning model based on the one or more entity feature embeddings for each user of the plurality of users. In some non-limiting embodiments or aspects, the present disclosure provides for determining whether to perform a threat prevention activity with regard to a network account of the user based on the user risk score for the user. In some non-limiting embodiments or aspects, the data associated with network activity for each user of the plurality of users comprises categorical feature data associated with network activity for each user of the plurality of users, and generating the one or more entity feature embeddings for each user includes generating one or more entity feature embeddings of the one or more entity feature embeddings for each user based on an output of a natural language processing machine learning model, wherein the output is based on an input that comprises the categorical feature data associated with network activity for that user.

In some non-limiting embodiments or aspects, the present disclosure provides for generating data associated with a result of a static rule-based model, wherein the result is determined based on data associated with a plurality of audit logs for a user provided as an input to the static rule-based model, and updating the temporal GNN machine learning model based on the data associated with the result of the static rule-based model.

In this way, non-limiting embodiments or aspects of the present disclosure provide for an efficient and effective solution to detecting threats to a network. Based on the use of a temporal GNN machine learning model, the present disclosure provides for an effective way to detect attacks that may span a period of time, as compared to a detector that is static in nature. In addition, the present disclosure may provide for threat alerts that are based on contextual information, such as peer grouping analysis, and include accurately adjusted risk scores for individual actors. Furthermore, the present disclosure provides for use of feedback to continuously improve performance of temporal GNN machine learning model and/or additional aspects of the analysis framework.

For the purpose of illustration, in the following description, while the presently disclosed subject matter is described with respect to systems, methods, and computer program products for providing for the use of a hybrid temporal GNN machine learning model to analyze cybersecurity threats in a network, one skilled in the art will recognize that the disclosed subject matter is not limited to the non-limiting embodiments or aspects disclosed herein. For example, the systems, methods, and computer program products described herein may be used with a wide variety of settings, such as analysis of trends and/or providing predictions based on prior behavior in any suitable setting, such as an online setting (e.g., a production setting) and for any suitable purpose, such as regressions, classifications, fraud prevention, transaction authorization, user authentication, user identification, feature selection, recommendations, and/or the like.

Referring now to FIG. 1, FIG. 1 is a schematic diagram of system 100 for providing an analysis framework for cybersecurity threats in a network using a hybrid temporal GNN, according to some non-limiting embodiments or aspects. As shown in FIG. 1, system 100 may include graph analysis system 102, data repository 104, user device 106, and communication network 108. Graph analysis system 102, data repository 104, and/or user device 106 may interconnect (e.g., establish a connection to communicate) via wired connections, wireless connections, or a combination of wired and wireless connections.

Graph analysis system 102 may include one or more devices configured to communicate with data repository 104 and/or user device 106 via communication network 108. For example, graph analysis system 102 may include a computing device, such as a server (e.g., a single server), a group of servers, and/or other like devices. In some non-limiting embodiments or aspects, graph analysis system 102 may include a processor and/or memory, as described herein. In some non-limiting embodiments or aspects, graph analysis system 102 may include one or more software instructions (e.g., one or more software applications) executing on a server (e.g., a single server), a group of servers, a computing device (e.g., a single computing device), a group of computing devices, and/or other like devices. In some non-limiting embodiments or aspects, graph analysis system 102 may be configured to perform one or more steps of methods described herein. In some non-limiting embodiments or aspects, graph analysis system 102 may be configured to communicate with a data storage device (e.g., data repository 104). In some non-limiting embodiments or aspects, graph analysis system 102 may be in communication with data repository 104 and/or user device 106, such that graph analysis system 102 is separate from data repository 104 and/or user device 106. In some non-limiting embodiments or aspects, user device 106 and/or data repository 104 may be implemented by (e.g., may be part of) graph analysis system 102.

In some non-limiting embodiments or aspects, graph analysis system 102 may generate (e.g., train, validate, re-train, and/or the like), store, and/or implement (e.g., operate, provide inputs to and/or outputs from, and/or the like) one or more machine learning models (e.g., one or more temporal GNN machine learning models). For example, graph analysis system 102 may generate one or more machine learning models by fitting (e.g., validating, testing, etc.) one or more machine learning models against data used for training (e.g., training data). In some non-limiting embodiments or aspects, graph analysis system 102 may generate, store, and/or implement one or more machine learning models that are provided for a production environment (e.g., a runtime environment, a real-time environment, etc.) used for providing inferences (e.g., secure inferences)

based on data inputs in a live situation (e.g., real-time situation). Additionally or alternatively, graph analysis system 102 may generate, store, and/or implement one or more machine learning models that are provided for a non-production environment (e.g., an offline environment, a training environment, etc.) used for providing inferences based on data inputs in a situation that is not live. In some non-limiting embodiments or aspects, graph analysis system 102 may be in communication with a data storage device (data repository 104), which may be local or remote to graph analysis system 102.

Data repository 104 may include one or more devices that are capable of being in communication with graph analysis system 102 and/or user device 106 via communication network 108. For example, data repository 104 may include a computing device, such as a server (e.g., a single server), a group of servers, and/or other like devices. In some non-limiting embodiments or aspects, data repository 104 may receive, store, and/or provide (e.g., transmit) one or more machine learning models. In some non-limiting embodiments or aspects, data repository 104 may be associated with one or more computing devices providing interfaces, such that a user (e.g., an administrative user, a user using a service account, and/or the like) may interact with data repository 104 via the one or more computing devices. Data repository 104 may be in communication with graph analysis system 102 and/or user device 106, such that data repository 104 is separate from graph analysis system 102 and/or user device 106. Alternatively, in some non-limiting embodiments or aspects, data repository 104 may be implemented by (e.g., may be part of) graph analysis system 102 and/or user device 106.

User device 106 may include a computing device configured to communicate with graph analysis system 102 and/or data repository 104 via communication network 108. For example, user device 106 may include a computing device, such as a desktop computer, a portable computer (e.g., tablet computer, a laptop computer, and/or the like), a mobile device (e.g., a cellular phone, a smartphone, a personal digital assistant, a wearable device, and/or the like), and/or other like devices. In some non-limiting embodiments or aspects, user device 106 may be associated with a user (e.g., an individual operating user device 106).

Communication network 108 may include one or more wired and/or wireless networks. For example, communication network 108 may include a cellular network (e.g., a long-term evolution (LTE) network, a third-generation (3G) network, a fourth-generation (4G) network, a fifth-generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN) and/or the like), a private network, an ad hoc network, an intranet, the Internet, a fiber optic-based network, a cloud computing network, and/or the like, and/or a combination of some or all of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of system 100 may perform one or more functions described as being performed by another set of devices of system 100.

Figure 2:
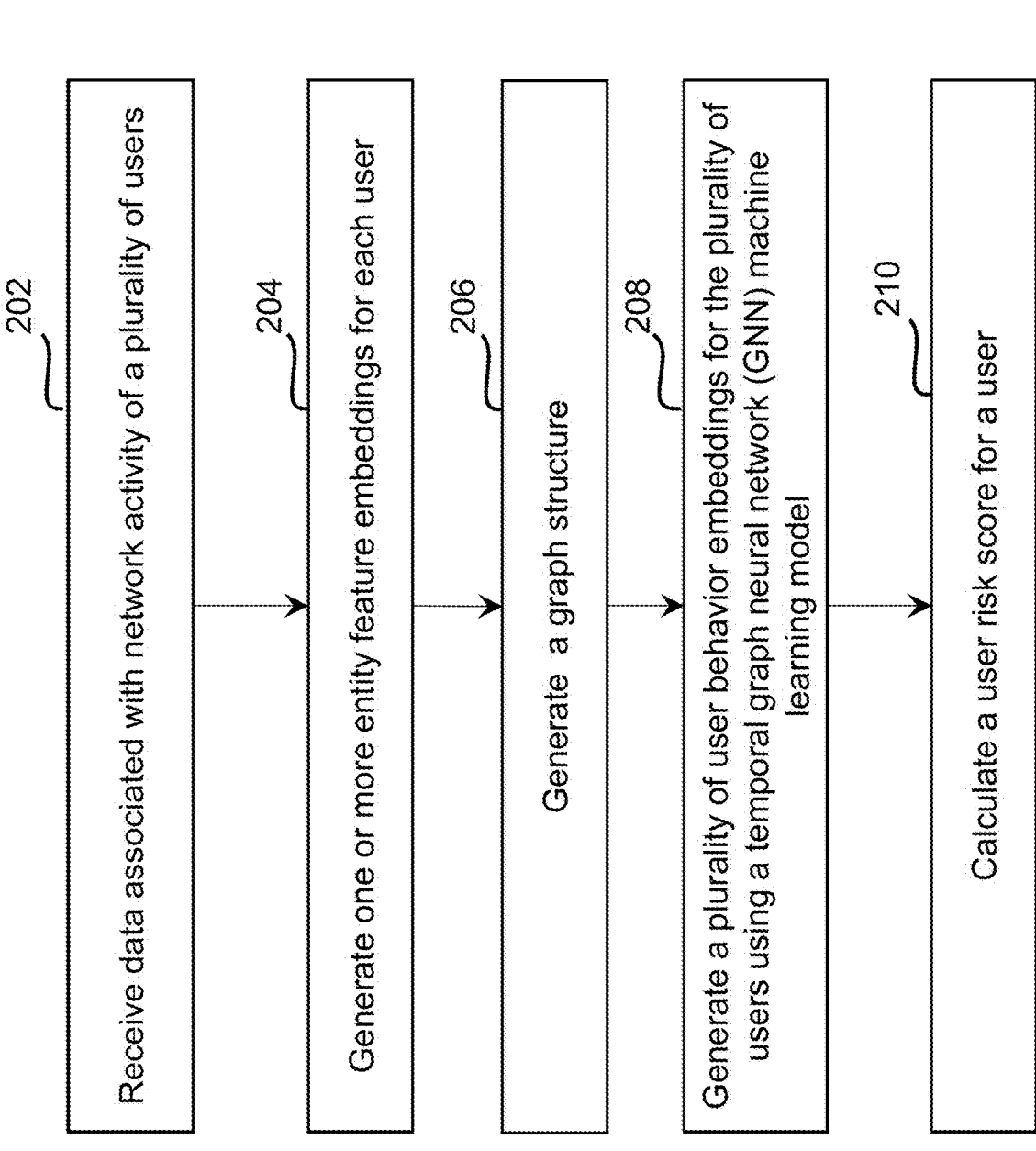
FIG. 2 is a flow diagram of a method for providing an analysis framework for cybersecurity threats in a network using a hybrid temporal graph neural network, according to some non-limiting embodiments or aspects.

Referring now to FIG. 2, FIG. 2 is a flow diagram of a non-limiting embodiment or aspect of process 200 for providing an analysis framework for cybersecurity threats in a network using a hybrid temporal GNN. In some non-limiting embodiments or aspects, one or more of the steps of process 200 may be performed (e.g., completely, partially, etc.) by graph analysis system 102 (e.g., one or more devices of graph analysis system 102). In some non-limiting embodiments or aspects, one or more of the steps of process 200 may be performed (e.g., completely, partially, etc.) by another device or a group of devices separate from or including graph analysis system 102 (e.g., one or more devices of graph analysis system 102), data repository 104 (e.g., one or more devices of data repository 104), and/or user device 106.

As shown in FIG. 2, at step 202, process 200 includes receiving data associated with network activity of a plurality of users. For example, graph analysis system 102 may receive data associated with network activity of each user of the plurality of users during a time interval (e.g., a time interval of a plurality of time intervals). In some non-limiting embodiments or aspects, the data associated with network activity may include data associated with activities carried out by each of the plurality of users on an enterprise network of an organization during a time interval (e.g., a time period, a timestamp that represents a time period, etc.). In some non-limiting embodiments or aspects, network activity may include accessing a program (e.g., a software application), performing an action involving a program, causing an action to be carried out by an application, activating a program, deactivating a program, and/or the like. In some non-limiting embodiments or aspects, the data may include data associated with network activity carried out by each user of the plurality of users for each data source of a plurality of data sources for network activity. For example, the data may include audit log data associated with a plurality of audit logs of network activity for each user of a plurality of users during a time interval. Each audit log of the plurality of audit logs may be associated with each data source of a plurality of data sources. In one example, the plurality of data sources may include an email activity data source, a cloud activity data source, a proxy data source, a sysLogs data source, a virtual private network (VPN) activity data source, a database activity data source, a director service activity data source (e.g., an active directory activity data source), a data loss prevention data source, a web application activity data source, a firewall activity data source, a printer activity data source, a physical badging activity data source, a workstation activity data source, and/or a Windows events activity data source. In some non-limiting embodiments or aspects, the data associated with network activity may include numerical feature data (e.g., numerical values of numerical features) associated with network activity for the plurality of users and/or categorical feature data (e.g., categorical values of categorical features, which may be represented as string data, such as a string of characters) associated with network activity for the plurality of users.

In some non-limiting embodiments or aspects, graph analysis system 102 may receive the data associated with network activity for the plurality of users as a dataset, and the dataset may include a plurality of data points (e.g., data instances, data examples, etc.) that are each associated with a time interval. In some non-limiting embodiments or aspects, each data point of the plurality of data points may include a timestamp associated with an event (e.g., an event with regard to network activity of a user). In some non-limiting embodiments or aspects, the dataset may be associated with one or more entities (e.g., one or more users, one or more accountholders, one or more merchants, one or more issuers, etc.). In one example, the plurality of data points may represent a plurality of transactions (e.g., electronic payment transactions) involving (e.g., conducted by) an entity. In some non-limiting embodiments or aspects, the plurality of data points may include a large amount of data points, such as at least 50 data points, at least 100 data points, at least 500 data points, at least 1,000 data points, at least 5,000 data points, at least 10,000 data points, at least 25,000 data points, at least 50,000 data points, at least 100,000 data points, at least 1,000,000 data points, and/or the like. In some examples, the plurality of data points may be associated with a plurality of features in the form of a plurality of network activity parameters (e.g., network activity variables). In some non-limiting embodiments or aspects, the dataset may include a training dataset to be used for training of a machine learning model, such as a temporal GNN machine learning model.

As shown in FIG. 2, at step 204, process 200 includes generating one or more entity feature embeddings for each user. For example, graph analysis system 102 may generate one or more entity feature embeddings for each user of the plurality of users based on the data associated with network activity of the plurality of users during a time interval. In some non-limiting embodiments or aspects, each entity feature embedding of the plurality of entity feature embeddings may correspond to each data source of a plurality of data sources for network activity (e.g., a plurality of data sources that generate data records based on network activity). For example, each entity feature embedding of the plurality of entity feature embeddings may correspond to a data source for which an audit log (e.g., an audit log of the plurality of audit logs) of network activity has been generated.

In some non-limiting embodiments or aspects, graph analysis system 102 may generate a plurality of entity feature embeddings for each user of the plurality of users based on data associated with network activity carried out by each user of the plurality of users for each data source of a plurality of data sources for network activity. For example, graph analysis system 102 may generate the plurality of entity feature embeddings for each user based on audit log data associated with a plurality of audit logs of network activity of each user during a time interval, where each audit log of the plurality of audit logs corresponds to each data source of a plurality of data sources.

In some non-limiting embodiments or aspects, graph analysis system 102 may generate one or more entity feature embeddings for a user based on numerical feature data and/or categorical feature data included in the data associated with network activity of the plurality of users. In some non-limiting embodiments or aspects, graph analysis system 102 may generate the one or more entity feature embeddings for a user by transforming the numerical feature data and/or the categorical feature data into a format, such as a vector format, which may be input into a temporal GNN machine learning model. The entity feature embeddings may include one or more numerical feature embeddings and/or one or more categorical feature embeddings. In some non-limiting embodiments or aspects, graph analysis system 102 may generate the one or more entity feature embeddings for a user by performing an encoding procedure (e.g., a one hot encoding procedure) on the numerical feature data and/or the categorical feature data. In some non-limiting embodiments or aspects, graph analysis system 102 may generate the one or more entity feature embeddings for a user by using a machine learning model to generate the one or more entity feature embeddings. For example, graph analysis system 102 may provide the numerical feature data and/or the categorical feature data as an input to the machine learning model, and graph analysis system 102 may generate the one or more entity feature embeddings based on the machine learning model (e.g., based on an output of the machine learning model, based on extracting the one or more entity feature embeddings from the machine learning model, etc.). In some non-limiting embodiments or aspects, graph analysis system 102 may normalize the numerical feature data and/or the categorical feature data. For example, graph analysis system 102 may normalize the numerical feature data and/or the categorical feature data prior to providing the numerical feature data and/or the categorical feature data as an input to the machine learning model. In another example, graph analysis system 102 may normalize the numerical feature data and/or the categorical feature data prior to generating a graph structure based on the numerical feature data and/or the categorical feature data.

In some non-limiting embodiments or aspects, graph analysis system 102 may generate one or more entity feature embeddings for a user by providing the numerical feature data and/or the categorical feature data included in the data associated with network activity of the plurality of users as an input to a natural language processing (NLP) machine learning model. In some non-limiting embodiments or aspects, graph analysis system 102 may generate one or more entity feature embeddings of the plurality of entity feature embeddings for each user based on an output of the NLP machine learning model. The output (e.g., an output that includes a categorical feature embedding) may be based on an input that includes the categorical feature data associated with network activity of a user. In this way, graph analysis system 102 may transform the categorical feature data into a numerical format that may be provided as an input to a temporal GNN machine learning model.

As shown in FIG. 2, at step 206, process 200 includes generating a graph structure. For example, graph analysis system 102 may generate the graph structure based on the plurality of entity feature embeddings for each user and/or the data associated with network activity for the plurality of users during a time interval. The graph structure may include a mathematical structure used to model pairwise relations between objects. In some non-limiting embodiments or aspects, the graph structure may include a dynamic graph structure, which may refer to a graph structure in which node data, edge data, and/or features may change over time. The dynamic graph may include a sequence of static graph structures, where each static graph structure corresponds to a specific time interval (e.g., a specific time period, a specific time step, a specific timestamp, etc.). In this way, graph analysis system 102 may generate a graph structure, such as a dynamic graph structure, which includes temporal aspects with regard to network activity of the plurality of users during a time interval. Accordingly, graph analysis system 102 may be able to more accurately determine whether the behavior of a user indicates that the user may cause damage to a network.

In some non-limiting embodiments or aspects, the graph structure may include a plurality of nodes and a plurality of edges. In some non-limiting embodiments or aspects, the graph structure may include node data associated with each node (e.g., vertex) and/or edge data associated with each edge (e.g., links) of the graph structure. In some non-limiting embodiments or aspects, each entity of a plurality of entities (e.g., each user of a plurality of users) may be represented by a node of the graph structure.

In some non-limiting embodiments or aspects, graph analysis system 102 may generate one or more nodes of the graph structure, such that the one or more nodes corresponds to one or more of the plurality of entity feature embeddings. For example, graph analysis system 102 may generate a node of the graph structure for each entity feature embedding of the plurality of entity feature embeddings. In some non-limiting embodiments or aspects, graph analysis system 102 may calculate a measure of relatedness (e.g., a measure of similarity, such as cosine similarity, and/or distance, such as Euclidean distance) for one or more pairs of the plurality of entity feature embeddings. In some non-limiting embodiments or aspects, graph analysis system 102 may generate one or more edges of the graph structure based on the measure of relatedness for pairs of the plurality of entity feature embeddings. For example, graph analysis system 102 may generate one or more edges of the graph structure based on a threshold-based approach (e.g., an edge may connect a pair of nodes if the measure of relatedness between the pair of nodes satisfies a threshold value) and/or a clustering approach, such as k-Nearest Neighbors (k-NN), where each node is connected by an edge to the most similar and/or closest nodes.

As shown in FIG. 2, at step 208, process 200 includes generating a plurality of user behavior embeddings for the plurality of users using a temporal graph neural network (GNN) machine learning model. For example, graph analysis system 102 may generate each user behavior embedding for the plurality of user behavior embeddings for each user of the plurality of users using a temporal GNN machine learning model. A user behavior embedding may include a representation of user's network activity during a time interval.

In some non-limiting embodiments or aspects, graph analysis system 102 may generate each user behavior embedding for the plurality of user behavior embeddings as a node embedding based on the graph structure. In some examples, graph analysis system 102 may generate each user behavior embedding of the plurality of user behavior embeddings based on performing a message passing procedure on the graph structure (e.g., a procedure by which information is aggregated for each node from neighboring nodes) with the temporal GNN machine learning model.

In some non-limiting embodiments or aspects, graph analysis system 102 may generate the temporal GNN machine learning model based on a graph structure. For example, graph analysis system 102 may generate the temporal GNN machine learning model based on a graph structure (e.g., a dynamic graph structure). In some non-limiting embodiments or aspects, graph analysis system 102 may train the temporal GNN machine learning model based on a dynamic graph structure, such that time is incorporated as a feature in nodes and/or edge embeddings of the temporal GNN machine learning model. In some non-limiting embodiments or aspects, the temporal GNN machine learning model may include one or more input layers, one or more hidden layers, and/or one or more output layers. In one example, the temporal GNN machine learning model may include a large number of nodes. In some non-limiting embodiments or aspects, the temporal GNN machine learning model may include a neural network machine learning model having 10 nodes, 20 nodes, 50 nodes, 100 nodes, 1,000 nodes, and/or the like.

In some non-limiting embodiments or aspects, graph analysis system 102 may extract node features and/or nodes or edge information (e.g., labels) from a graph structure to provide an input to a GNN layer (e.g., a graph convolutional layer) to aggregate neighbor information among nodes of the graph structure. In some non-limiting embodiments or aspects, graph analysis system 102 may apply an activation function (e.g., a non-linear activation function, such as a ReLU activation function) to an output of the GNN layer. In some non-limiting embodiments or aspects, graph analysis system 102 may provide an output of the activation function as an input to an output layer of the temporal GNN machine learning model. In some non-limiting embodiments or aspects, the output layer may be defined based on a task for which the temporal GNN machine learning model is designed (e.g., a softmax output layer for classification).

As shown in FIG. 2, at step 210, process 200 includes calculating a user risk score for a user. For example, graph analysis system 102 may calculate a user risk score for a user based on one or more user behavior embeddings of the plurality of user behavior embeddings for the plurality of users. The user risk score may represent a measurement of a risk associated with behavior of the user to cause damage to a network.

In some non-limiting embodiments or aspects, graph analysis system 102 may determine a plurality of peer groups for a plurality of users based on the plurality of user behavior embeddings. For example, graph analysis system 102 may calculate a measure of relatedness between the plurality of user behavior embeddings, and graph analysis system 102 may generate the plurality of peer groupings using a clustering approach (e.g., k-NN) based on the measure of relatedness between the plurality of user behavior embeddings.

In some non-limiting embodiments or aspects, graph analysis system 102 may determine whether a user exhibits behavioral anomalies based on the plurality of user behavior embeddings. For example, graph analysis system 102 may compare a user behavior embedding for a user to one or more user behavior embeddings of the plurality of user behavior embeddings. If the user behavior embedding of the user indicates that the user exhibits abnormal behavior during a time interval (e.g., if the user behavior embedding of the user satisfies a threshold value of relatedness with regard to one or more user behavior embeddings of the plurality of user behavior embeddings), graph analysis system 102 may determine that the user exhibits behavioral anomalies. If the user behavior embedding of the user does not indicate that the user exhibits abnormal behavior during a time interval (e.g., if the user behavior embedding of the user does not satisfy a threshold value of relatedness with regard to one or more user behavior embeddings of the plurality of user behavior embeddings), graph analysis system 102 may determine that the user does not exhibit behavioral anomalies.

In some non-limiting embodiments or aspects, graph analysis system 102 may determine whether a user exhibits behavioral anomalies based on the plurality of peer groupings. For example, graph analysis system 102 may compare a user behavior embedding for a user to one or more peer groupings of the plurality of peer groupings. If the user behavior embedding of the user indicates that the user exhibits abnormal behavior during a time interval (e.g., if the user behavior embedding of the user satisfies a threshold value of relatedness with regard to one or more peer groupings of the plurality of peer groupings), graph analysis system 102 may determine that the user exhibits behavioral anomalies. If the user behavior embedding of the user does not indicate that the user exhibits abnormal behavior during a time interval (e.g., if the user behavior embedding of the user does not satisfy a threshold value of relatedness with regard to one or more peer groupings of the plurality of peer groupings), graph analysis system 102 may determine that the user does not exhibit behavioral anomalies.

In some non-limiting embodiments or aspects, graph analysis system 102 may determine (e.g., calculate) one or more metrics for a user. For example, graph analysis system 102 may determine, based on the plurality of peer groups for the plurality of users, a metric associated with a peer grouping of the first user (e.g., a metric associated with how closely the first user is related to a specific peer grouping), a metric associated with behavioral anomalies of the first user, and/or a metric associated with one or more results of one or more static rule-based models (e.g., a metric associated with one or more rule-based alerts generated based on results of one or more static rule-based models) for the user. In some non-limiting embodiments or aspects, graph analysis system 102 may calculate the user risk score for the user based on the metric associated with a peer grouping of the first user, the metric associated with behavioral anomalies of the first user, and/or the metric associated with one or more results of one or more static rule-based models for the user.

In some non-limiting embodiments or aspects, graph analysis system 102 may perform an action, such as a threat prevention procedure, based on the user risk score for the user. A threat prevention procedure may include locking an account of the user (e.g., a network account of the user, an email account of the user, an account of the user that is associated with access to one or more network applications, etc.) to prevent the user from performing network activity. Additionally or alternatively, threat prevention procedure may include generating and/or transmitting an alert (e.g., an alert message) to one or more entities associated with operation of a network.

In some non-limiting embodiments or aspects, graph analysis system 102 may determine whether to perform the action based on the user risk score. For example, graph analysis system 102 may compare the user risk score to a threshold value. If the user risk score satisfies the threshold value, graph analysis system 102 may determine to perform the action. If the user risk score does not satisfy the threshold value, graph analysis system 102 may determine not to perform the action.

In some non-limiting embodiments or aspects, graph analysis system 102 may perform a threat prevention procedure associated with protection of an account of a user (e.g., a user associated with user device 106) based on the user risk score for the user. For example, if the user risk score indicates that the threat prevention procedure is necessary, graph analysis system 102 may perform the threat prevention procedure associated with an account of the user. In such an example, if the user risk score indicates that the threat prevention procedure is not necessary, graph analysis system 102 may forego performing the threat prevention procedure associated with the account of the user. In some non-limiting embodiments or aspects, graph analysis system 102 may execute a threat prevention procedure based on a classification of an input (e.g., a node of a graph structure) as provided by the temporal GNN machine learning model.

In some non-limiting embodiments or aspects, graph analysis system 102 may generate data associated with a result of a static rule-based model for a user (e.g., a metric associated with a result of a static rule-based models for a user). The result may be determined based on data associated with network activity of the user provided as an input to the static rule-based model. In some non-limiting embodiments or aspects, graph analysis system 102 may update the temporal GNN machine learning model and/or one or more static rule-based models based on feedback data. For example, graph analysis system 102 may update the temporal GNN machine learning model and/or one or more static rule-based models based on the data associated with the result of the static rule-based model. Additionally or alternatively, graph analysis system 102 may update the temporal GNN machine learning model and/or one or more static rule-based models based on one or more user behavior embeddings of the plurality of user behavior embeddings. Additionally or alternatively, graph analysis system 102 may update the temporal GNN machine learning model and/or one or more static rule-based models based on data provided by an analyst (e.g., an operator of the temporal GNN machine learning model).

In some non-limiting embodiments or aspects, graph analysis system 102 may auto-tune one or more static rule-based models based on the data associated with the result of the static rule-based model. For example, graph analysis system 102 may convert a result of the static rule-based model (e.g., a result that includes an alert) into a vector, conduct a similarity analysis to other results of the static rule-based model, and automatically update the static rule-based model based on the similarity analysis.

Referring now to FIGS. 3A-3E, shown are schematic diagrams of implementation 300 of a process (e.g., process 200) for providing an analysis framework for cybersecurity threats in a network using a hybrid temporal GNN. In some non-limiting embodiments or aspects, one or more of the steps of the process may be performed (e.g., completely, partially, etc.) by graph analysis system 102 (e.g., one or more devices of graph analysis system 102). In some non-limiting embodiments or aspects, one or more of the steps of the process may be performed (e.g., completely, partially, etc.) by another device or a group of devices separate from or including graph analysis system 102 (e.g., one or more devices of graph analysis system 102), data repository 104, and/or user device 106.

Figure 3A:
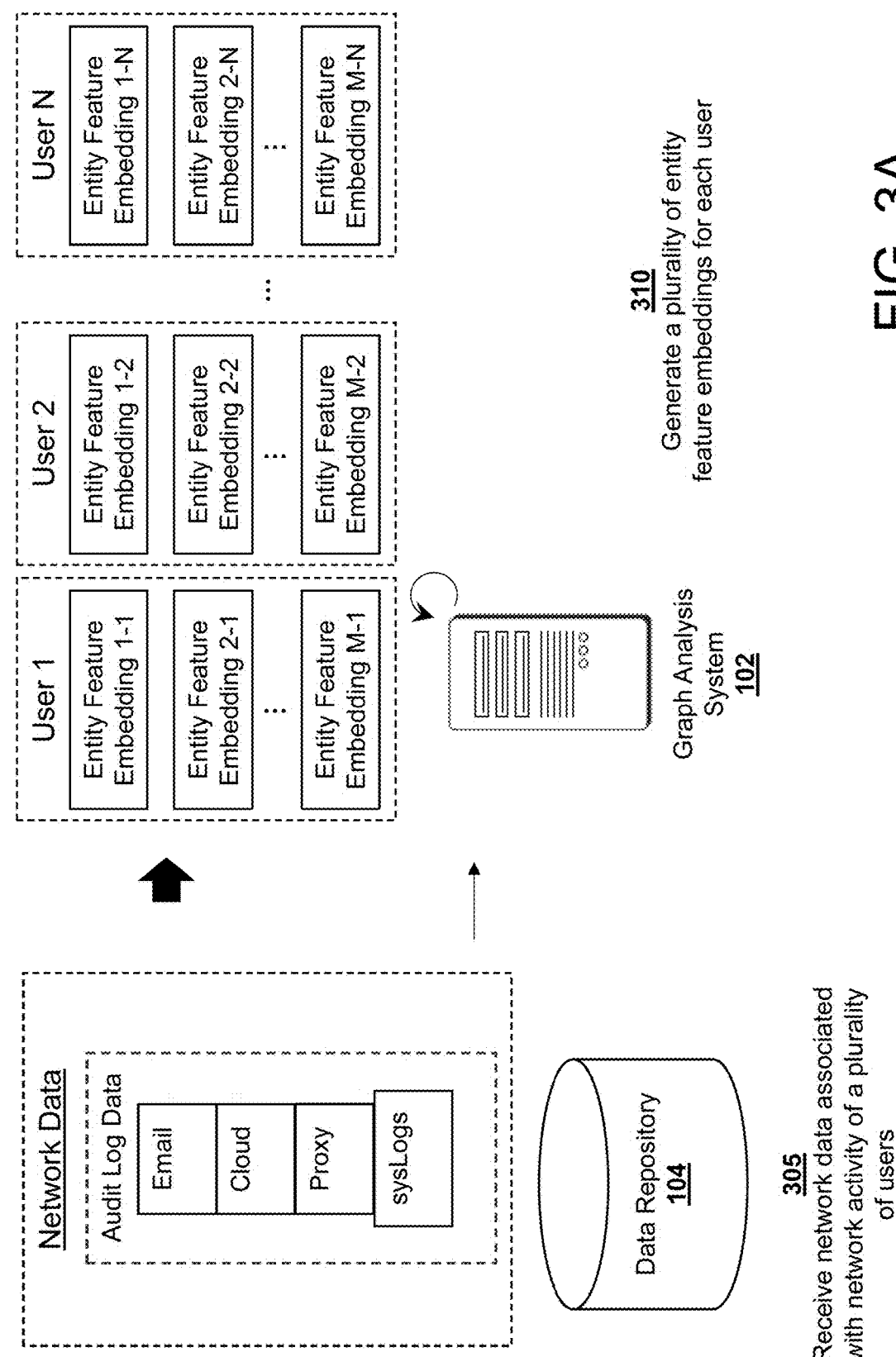

As shown by reference number 305 in FIG. 3A, graph analysis system 102 may receive network data associated with network activity of a plurality of users. In some non-limiting embodiments or aspects, the data associated with network activity may include data associated with activities carried out by each of the plurality of users on an enterprise network of an organization during a time interval (e.g., a time period, a timestamp that represents a time period, etc.). In some non-limiting embodiments or aspects, network activity may include accessing a program (e.g., a software application), performing an action involving a program, causing an action to be carried out by an application, activating a program, deactivating a program, and/or the like. In some non-limiting embodiments or aspects, the data may include data associated with network activity carried out by each user of the plurality of users for each data source of a plurality of data sources for network activity. For example, the data may include audit log data associated with a plurality of audit logs of network activity for each user of a plurality of users during a time interval. Each audit log of the plurality of audit logs may be associated with each data source of a plurality of data sources. In one example, the plurality of data sources may include an email activity data source, a cloud activity data source, a proxy data source, a sysLogs data source, a VPN activity data source, a database activity data source, a director service activity data source (e.g., an active directory activity data source), a data loss prevention data source, a web application activity data source, a firewall activity data source, a printer activity data source, a physical badging activity data source, a workstation activity data source, and/or a Windows events activity data source. In some non-limiting embodiments or aspects, the data associated with network activity may include numerical feature data (e.g., numerical values of numerical features) associated with network activity of the plurality of users and/or categorical feature data (e.g., categorical values of categorical features, which may be represented as string data, such as a string of characters) associated with network activity of the plurality of users.

As shown by reference number 310 in FIG. 3A, graph analysis system 102 may generate a plurality of entity feature embeddings for each user. In some non-limiting embodiments or aspects, graph analysis system 102 may generate one or more entity feature embeddings for each user of the plurality of users based on the data associated with network activity of the plurality of users during a time interval. In some non-limiting embodiments or aspects, graph analysis system 102 may generate a plurality of entity feature embeddings for each user of the plurality of users based on data associated with network activity carried out by each user of the plurality of users for each data source of a plurality of data sources for network activity. For example, graph analysis system 102 may generate the plurality of entity feature embeddings for each user based on audit log data associated with a plurality of audit logs of network activity of each user during a time interval, where each audit log of the plurality of audit logs corresponds to each data source of a plurality of data sources.

In some non-limiting embodiments or aspects, graph analysis system 102 may generate one or more entity feature embeddings for a user by providing the numerical feature data and/or the categorical feature data included in the data associated with network activity of the plurality of users as an input to an NLP machine learning model. In some non-limiting embodiments or aspects, graph analysis system 102 may generate one or more entity feature embeddings of the plurality of entity feature embeddings for each user based on an output of the NLP machine learning model. The output (e.g., an output that includes a categorical feature embedding) may be based on an input that includes the categorical feature data associated with network activity of a user. In this way, graph analysis system 102 may transform the categorical feature data into a numerical format that may be provided as an input to a temporal GNN machine learning model.

Figure 3B:
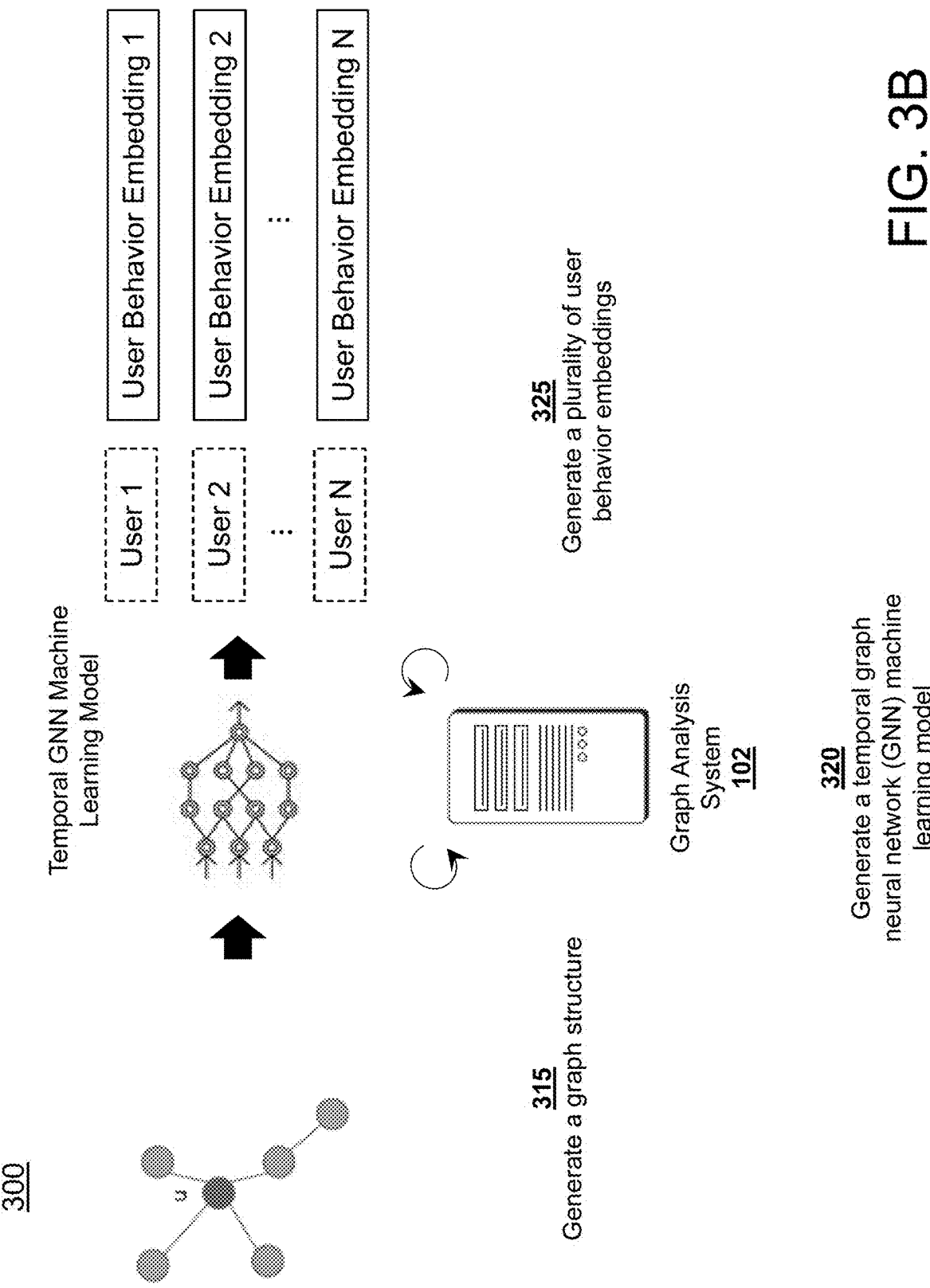

As shown by reference number 315 in FIG. 3B, graph analysis system 102 may generate a graph structure. For example, graph analysis system 102 may generate a dynamic graph structure based on the network data associated with network activity of the plurality of users and/or the plurality of entity feature embeddings for each user. The dynamic graph may include a sequence of static graph structures, where each static graph structure corresponds to a specific time interval (e.g., a specific time period, a specific time step, a specific timestamp, etc.). In this way, graph analysis system 102 may generate a graph structure, such as a dynamic graph structure, that includes temporal aspects with regard to network activity of the plurality of users during a time interval. Accordingly, graph analysis system

102 may be able to more accurately determine whether the behavior of a user indicates that the user may cause damage to a network.

As shown by reference number 320 in FIG. 3B, graph analysis system 102 may generate a temporal graph neural network (GNN) machine learning model. For example, graph analysis system 102 may generate the temporal GNN machine learning model based on the graph structure. In some non-limiting embodiments or aspects, graph analysis system 102 may train the temporal GNN machine learning model based on a dynamic graph structure, such that time is incorporated as a feature in nodes and/or edge embeddings of the temporal GNN machine learning model. In some non-limiting embodiments or aspects, the temporal GNN machine learning model may include one or more input layers, one or more hidden layers, and/or one or more output layers. In one example, the temporal GNN machine learning model may include a large number of nodes. In some non-limiting embodiments or aspects, the temporal GNN machine learning model may include a neural network machine learning model having 10 nodes, 20 nodes, 50 nodes, 100 nodes, 1,000 nodes, and/or the like.

As shown by reference number 325 in FIG. 3B, graph analysis system 102 may generate a plurality of user behavior embeddings. For example, graph analysis system 102 may generate the plurality of user behavior embeddings based on the temporal GNN machine learning model. In some non-limiting embodiments or aspects, graph analysis system 102 may generate each user behavior embedding of the plurality of user behavior embeddings for each user of the plurality of users using a temporal GNN machine learning model. A user behavior embedding may include a representation of user's network activity during a time interval.

Figure 3C:
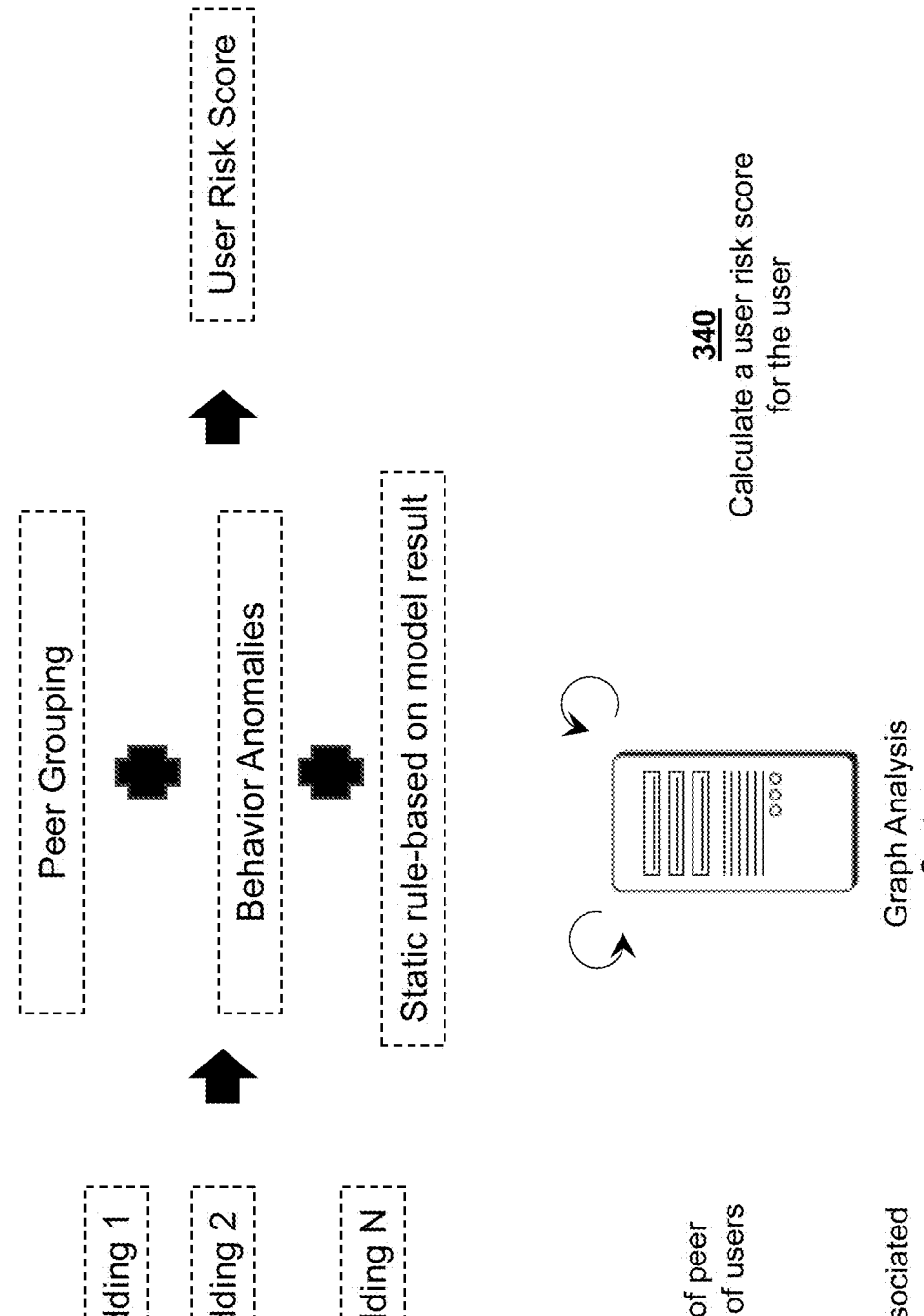

As shown by reference number 330 in FIG. 3C, graph analysis system 102 may determine a plurality of peer groups for the plurality of users. For example, graph analysis system 102 may determine the plurality of peer groups for the plurality of users based on the plurality of user behavior embeddings. In some non-limiting embodiments or aspects, graph analysis system 102 may calculate a measure of relatedness between the plurality of user behavior embeddings, and graph analysis system 102 may generate the plurality of peer groupings using a clustering approach (e.g., k-NN) based on the measure of relatedness between the plurality of user behavior embeddings.

As shown by reference number 335 in FIG. 3C, graph analysis system 102 may determine a metric associated with a peer grouping of a user, a metric associated with behavioral anomalies of the user, and a metric associated with one or more results of one or more static rule-based models for the user. As shown by reference number 340 in FIG. 3C, graph analysis system 102 may calculate a user risk score for the user. In some non-limiting embodiments or aspects, graph analysis system 102 may calculate the user risk score for the user based on the metric associated with a peer grouping of the first user, the metric associated with behavioral anomalies of the first user, and/or the metric associated with one or more results of one or more static rule-based models for the user.

Figure 3D:
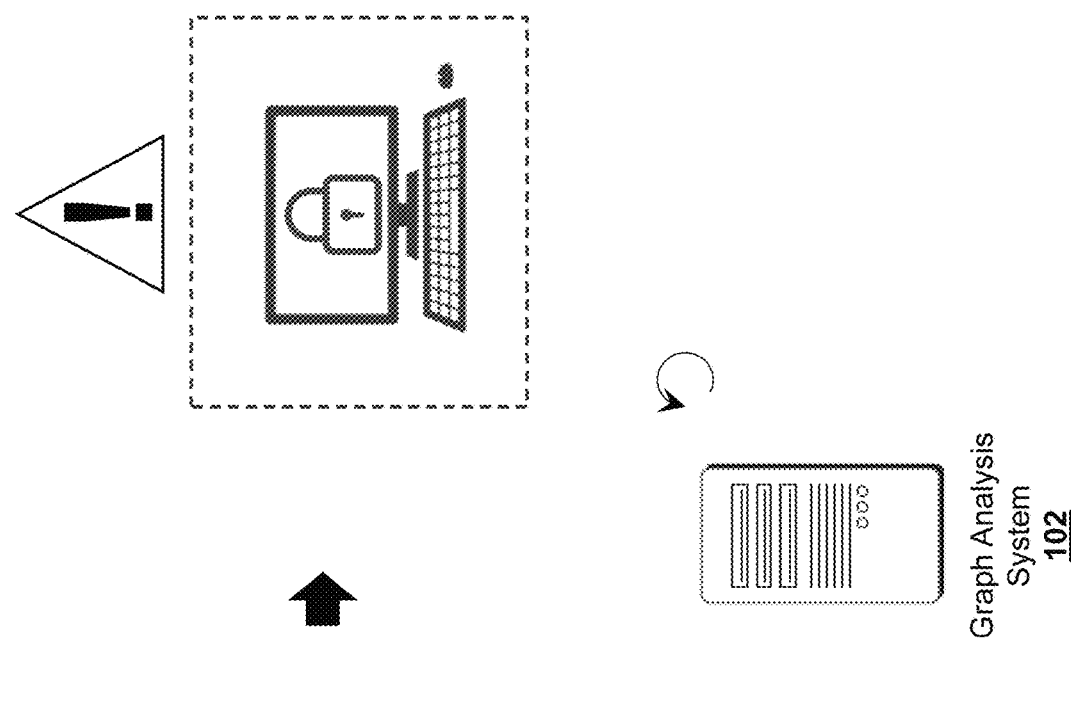

As shown by reference number 345 in FIG. 3D, graph analysis system 102 may perform a threat prevention procedure with regard to a network account of the user based on the user risk score for the user. As shown by reference number 350 in FIG. 3E, graph analysis system 102 may update the temporal GNN machine learning model and/or one or more static rule-based models based on feedback.

Figure 4:
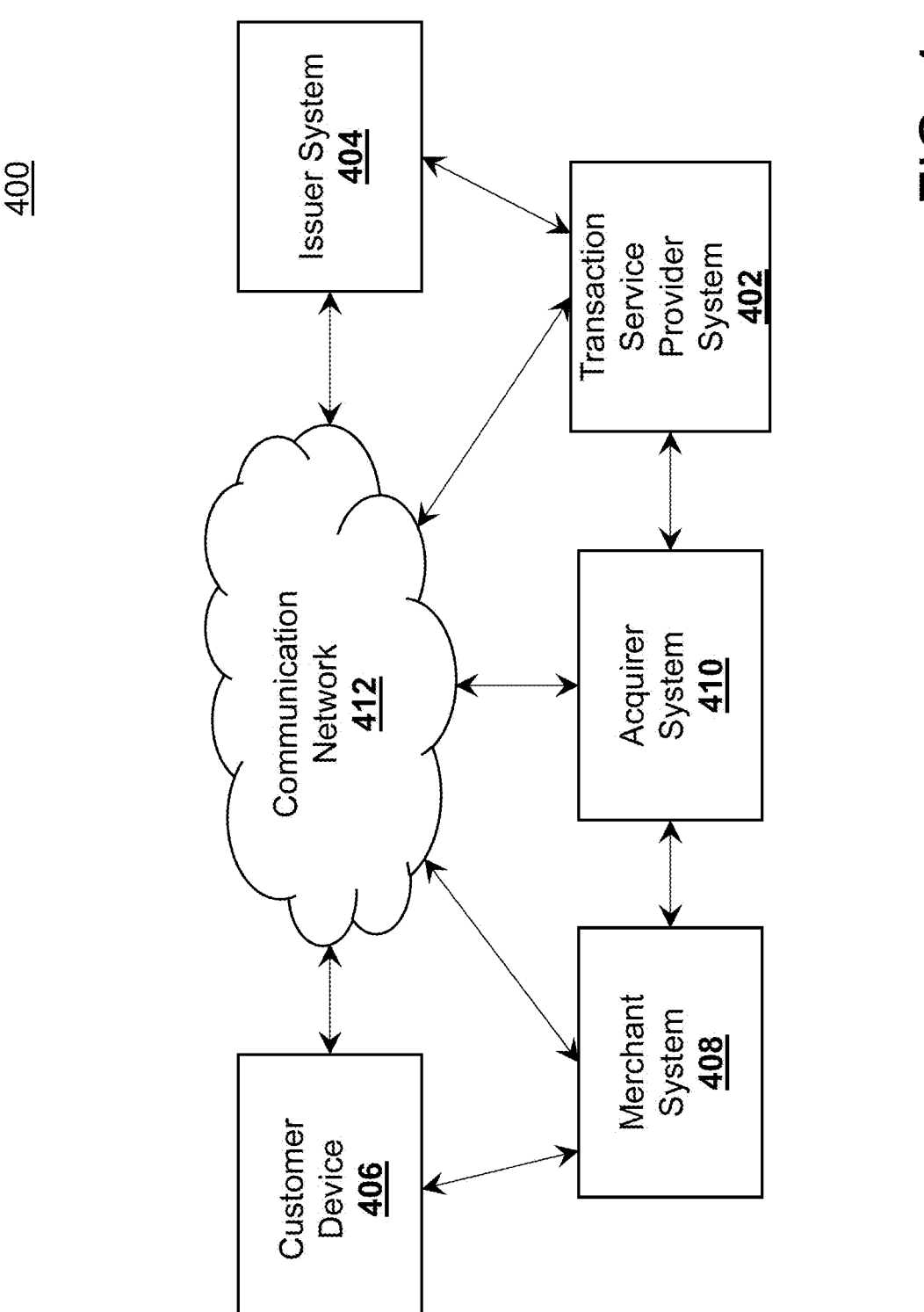
FIG. 4 is a diagram of an exemplary environment in which systems, methods, and/or computer program products, described herein, may be implemented, according to some non-limiting embodiments or aspects.

Referring now to FIG. 4, FIG. 4 is a diagram of a non-limiting embodiment or aspect of environment 400 in which systems, methods, and/or products, as described herein, may be implemented. As shown in FIG. 4, environment 400 may include transaction service provider system 402, issuer system 404, customer device 406, merchant system 408, acquirer system 410, and communication network 412. In some non-limiting embodiments or aspects, each of graph analysis system 102, data repository 104, and/or user device 106 of FIG. 1 may be implemented by (e.g., part of) transaction service provider system 402. In some non-limiting embodiments or aspects, at least one of graph analysis system 102, data repository 104, and/or user device 106 of FIG. 1 may be implemented by (e.g., part of) another system, another device, another group of systems, or another group of devices, separate from or including transaction service provider system 402, such as issuer system 404, customer device 406, merchant system 408, acquirer system 410, and/or the like.

Transaction service provider system 402 may include one or more devices capable of receiving information from and/or communicating information to issuer system 404, customer device 406, merchant system 408, and/or acquirer system 410 via communication network 412. For example, transaction service provider system 402 may include a computing device, such as a server (e.g., a transaction processing server), a group of servers, and/or other like devices. In some non-limiting embodiments or aspects, transaction service provider system 402 may be associated with a transaction service provider as described herein. In some non-limiting embodiments or aspects, transaction service provider system 402 may be in communication with a data storage device, which may be local or remote to transaction service provider system 402. In some non-limiting embodiments or aspects, transaction service provider system 402 may be capable of receiving information from, storing information in, communicating information to, or searching information stored in the data storage device.

Issuer system 404 may include one or more devices capable of receiving information and/or communicating information to transaction service provider system 402, customer device 406, merchant system 408, and/or acquirer system 410 via communication network 412. For example, issuer system 404 may include a computing device, such as a server, a group of servers, and/or other like devices. In some non-limiting embodiments or aspects, issuer system 404 may be associated with an issuer institution as described herein. For example, issuer system 404 may be associated with an issuer institution that issued a credit account, debit account, credit card, debit card, and/or the like to a user associated with customer device 406.

Customer device 406 may include one or more devices capable of receiving information from and/or communicating information to transaction service provider system 402, issuer system 404, merchant system 408, and/or acquirer system 410 via communication network 412. Additionally or alternatively, each customer device 406 may include a device capable of receiving information from and/or communicating information to other customer devices 406 via communication network 412, another network (e.g., an ad hoc network, a local network, a private network, a virtual private network, and/or the like), and/or any other suitable communication technique. For example, customer device 406 may include a client device and/or the like. In some non-limiting embodiments or aspects, customer device 406 may or may not be capable of receiving information (e.g., from merchant system 408 or from another customer device 406) via a short-range wireless communication connection (e.g., a near field communication (NFC) connection, a radio frequency identification (RFID) communication connection, a Bluetooth® communication connection, a Zigbee® communication connection, and/or the like), and/or communicating information (e.g., to merchant system 408) via a short-range wireless communication connection.

Merchant system 408 may include one or more devices capable of receiving information from and/or communicating information to transaction service provider system 402, issuer system 404, customer device 406, and/or acquirer system 410 via communication network 412. Merchant system 408 may also include a device capable of receiving information from customer device 406 via communication network 412, a communication connection (e.g., an NFC connection, an RFID communication connection, a Bluetooth® communication connection, a Zigbee® communication connection, and/or the like) with customer device 406, and/or the like, and/or communicating information to customer device 406 via communication network 412, the communication connection, and/or the like. In some non-limiting embodiments or aspects, merchant system 408 may include a computing device, such as a server, a group of servers, a client device, a group of client devices, and/or other like devices. In some non-limiting embodiments or aspects, merchant system 408 may be associated with a merchant as described herein. In some non-limiting embodiments or aspects, merchant system 408 may include one or more client devices. For example, merchant system 408 may include a client device that allows a merchant to communicate information to transaction service provider system 402. In some non-limiting embodiments or aspects, merchant system 408 may include one or more devices, such as computers, computer systems, and/or peripheral devices capable of being used by a merchant to conduct a transaction with a user. For example, merchant system 408 may include a POS device and/or a POS system.

Acquirer system 410 may include one or more devices capable of receiving information from and/or communicating information to transaction service provider system 402, issuer system 404, customer device 406, and/or merchant system 408 via communication network 412. For example, acquirer system 410 may include a computing device, a server, a group of servers, and/or the like. In some non-limiting embodiments or aspects, acquirer system 410 may be associated with an acquirer as described herein.

Communication network 412 may include one or more wired and/or wireless networks. For example, communication network 412 may include a cellular network (e.g., a long-term evolution (LTE) network, a third generation (3G) network, a fourth generation (4G) network, a fifth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 4 are provided as an example. There may be additional systems, devices, and/or networks; fewer systems, devices, and/or networks; different systems, devices, and/or networks; and/or differently arranged systems, devices, and/or networks than those shown in FIG. 4.

Furthermore, two or more systems or devices shown in FIG. 4 may be implemented within a single system or device, or a single system or device shown in FIG. 4 may be implemented as multiple, distributed systems or devices. Additionally or alternatively, a set of systems (e.g., one or more systems) or a set of devices (e.g., one or more devices) of environment 400 may perform one or more functions described as being performed by another set of systems or another set of devices of environment 400.

Figure 5:
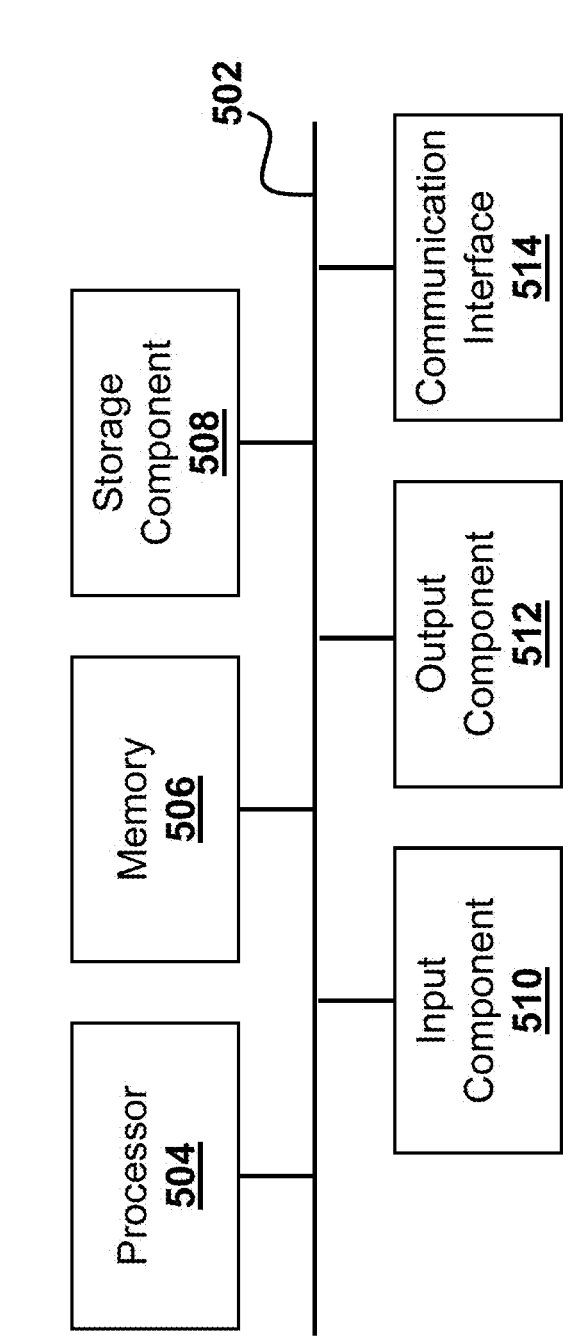
FIG. 5 is a schematic diagram of example components of one or more devices of FIG. 1 and/or FIG. 4, according to some non-limiting embodiments or aspects.

Referring now to FIG. 5, shown is a diagram of example components of device 500, according to some non-limiting embodiments or aspects. Device 500 may correspond to at least one of graph analysis system 102, data repository 104, and/or user device 106 in FIG. 1 and/or at least one of transaction service provider system 402, issuer system 404, customer device 406, merchant system 408, and/or acquirer system 410 in FIG. 4, as an example. In some non-limiting embodiments or aspects, such systems or devices in FIG. 1 or FIG. 4 may include at least one device 500 and/or at least one component of device 500. The number and arrangement of components shown in FIG. 5 are provided as an example. In some non-limiting embodiments or aspects, device 500 may include additional components, fewer components, different components, or differently arranged components than those shown in FIG. 5. Additionally or alternatively, a set of components (e.g., one or more components) of device 500 may perform one or more functions described as being performed by another set of components of device 500.

As shown in FIG. 5, device 500 may include bus 502, processor 504, memory 506, storage component 508, input component 510, output component 512, and communication interface 514. Bus 502 may include a component that permits communication among the components of device 500. In some non-limiting embodiments or aspects, processor 504 may be implemented in hardware, firmware, or a combination of hardware and software. For example, processor 504 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 506 may include random access memory (RAM), read only memory (ROM), and/or another type of dynamic or static storage device (e.g., flash memory, magnetic memory, optical memory, etc.) that stores information and/or instructions for use by processor 504.

With continued reference to FIG. 5, storage component 508 may store information and/or software related to the operation and use of device 500. For example, storage component 508 may include a hard disk (e.g., a magnetic disk, an optical disk, a magneto-optic disk, a solid-state disk, etc.) and/or another type of computer-readable medium. Input component 510 may include a component that permits device 500 to receive information, such as via user input (e.g., a touch screen display, a keyboard, a keypad, a mouse, a button, a switch, a microphone, etc.). Additionally or alternatively, input component 510 may include a sensor for sensing information (e.g., a global positioning system (GPS) component, an accelerometer, a gyroscope, an actuator, etc.). Output component 512 may include a component that provides output information from device 500 (e.g., a display, a speaker, one or more light-emitting diodes (LEDs), etc.). Communication interface 514 may include a transceiver-like component (e.g., a transceiver, a separate receiver and transmitter, etc.) that enables device 500 to communicate with other devices, such as via a wired connection, a wireless connection, or a combination of wired and wireless connections. Communication interface 514 may permit device 500 to receive information from another device and/or provide information to another device. For example, communication interface 514 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 500 may perform one or more processes described herein. Device 500 may perform these processes based on processor 504 executing software instructions stored by a computer-readable medium, such as memory 506 and/or storage component 508. A computer-readable medium may include any non-transitory memory device. A memory device includes memory space located inside of a single physical storage device or memory space spread across multiple physical storage devices. Software instructions may be read into memory 506 and/or storage component 508 from another computer-readable medium or from another device via communication interface 514. When executed, software instructions stored in memory 506 and/or storage component 508 may cause processor 504 to perform one or more processes described herein. Additionally or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method, comprising:

receiving, with at least one processor, data associated with network activity on a network of each user of a plurality of users during a time interval, wherein the data associated with the network activity of each user of the plurality of users during the time interval comprises:

data associated with:

accessing a program;

performing an action involving the program;

causing the action to be carried out by an application;

activating the program;

deactivating the program; or

any combination thereof, and wherein the data associated with the network activity of each user of the plurality of users during the time interval comprises data associated with the network activity carried out by each user of the plurality of users for each data source of a plurality of data sources for network activity;

generating, with at least one processor, one or more entity feature embeddings for each user based on the data associated with the network activity of that user during the time interval;

generating, with at least one processor, a plurality of user behavior embeddings for the plurality of users based on one or more outputs of a temporal graph neural network (GNN) machine learning model, wherein each user behavior embedding comprises a representation of network activity of a user during the time interval, wherein the temporal GNN machine learning model was generated based on the one or more entity feature embeddings for each user of the plurality of users, and wherein time is incorporated as a feature in nodes or edge embeddings of the temporal GNN machine learning model; and calculating, with at least one processor, a user risk score for a first user based on the plurality of user behavior embeddings, wherein the user risk score represents a measurement of a risk associated with behavior of the first user to cause damage to the network.

2. The method of claim 1, further comprising:

determining a plurality of peer groups for the plurality of users based on the plurality of user behavior embeddings; and determining, based on the plurality of peer groups for the plurality of users, at least one of the following:

a metric associated with a peer grouping of the first user;

a metric associated with behavioral anomalies of the first user;

a metric associated with one or more results of one or more static rule-based models for the user; or any combination thereof;

wherein calculating the user risk score for the user comprises:

calculating the user risk score for the first user based on at least one of the following:

the metric associated with a peer grouping of the first user;

the metric associated with behavioral anomalies of the first user;

the metric associated with one or more results of one or more static rule-based models for the user; or any combination thereof.

3. The method of claim 1, further comprising:

generating the temporal GNN machine learning model based on the one or more entity feature embeddings for each user of the plurality of users.

4. The method of claim 1, further comprising:

determining whether to perform a threat prevention activity with regard to a network account of the user based on the user risk score for the user.

5. The method of claim 1, wherein the data associated with the network activity of each user of the plurality of users comprises categorical feature data associated with the network activity of each user of the plurality of users, and wherein generating the one or more entity feature embeddings for each user comprises:

generating one or more entity feature embeddings of the one or more entity feature embeddings for each user based on an output of a natural language processing (NLP) machine learning model, wherein the output is based on an input that comprises the categorical feature data associated with the network activity of that user.

6. The method of claim 1, further comprising:

generating data associated with a result of a static rule-based model for a user, wherein the result is determined based on the data associated with the network activity of the user provided as an input to the static rule-based model; and updating the temporal GNN machine learning model based on the data associated with the result of the static rule-based model.

7. The method of claim 1, wherein receiving the data associated with the network activity of each user of the plurality of users during the time interval comprises:

receiving data associated with a plurality of audit logs for each user of the plurality of users, wherein the plurality of audit logs are associated with the network activity of a user during the time interval;

wherein generating the one or more entity feature embeddings for each user comprises:

generating a plurality of entity feature embeddings for each user based on the data associated with the plurality of audit logs for that user, wherein each entity feature embedding of the plurality of entity feature embeddings corresponds to each audit log of the plurality of audit logs.

8. A system, comprising:

at least one processor configured to:

receive data associated with network activity on a network of each user of a plurality of users during a time interval, wherein the data associated with the network activity of each user of the plurality of users during the time interval comprises:

data associated with:

accessing a program;

performing an action involving the program;

causing the action to be carried out by an application;

activating the program;

deactivating the program; or any combination thereof, and wherein the data associated with the network activity of each user of the plurality of users during the time interval comprises data associated with the network activity carried out by each user of the plurality of users for each data source of a plurality of data sources for network activity;

generate one or more entity feature embeddings for each user based on the data associated with the network activity of that user during the time interval;

generate a plurality of user behavior embeddings for the plurality of users based on one or more outputs of a temporal graph neural network (GNN) machine learning model, wherein each user behavior embedding comprises a representation of network activity of a user during the time interval, wherein the temporal GNN machine learning model was generated based on the one or more entity feature embeddings for each user of the plurality of users, and wherein time is incorporated as a feature in nodes or edge embeddings of the temporal GNN machine learning model; and calculate a user risk score for a first user based on the plurality of user behavior embeddings, wherein the user risk score represents a measurement of a risk associated with behavior of the first user to cause damage to the network.

9. The system of claim 8, wherein the at least one processor is further configured to:

determine a plurality of peer groups for the plurality of users based on the plurality of user behavior embeddings; and determine, based on the plurality of peer groups for the plurality of users, at least one of the following:

a metric associated with a peer grouping of the first user;

a metric associated with behavioral anomalies of the first user;

a metric associated with one or more results of one or more static rule-based models for the user; or any combination thereof;

wherein, when calculating the user risk score for the user, the at least one processor is configured to:

calculate the user risk score for the first user based on at least one of the following:

the metric associated with a peer grouping of the first user;

the metric associated with behavioral anomalies of the first user;

the metric associated with one or more results of one or more static rule-based models for the user; or any combination thereof.

10. The system of claim 8, wherein the at least one processor is further configured to:

generate the temporal GNN machine learning model based on the one or more entity feature embeddings for each user of the plurality of users.

11. The system of claim 8, wherein the at least one processor is further configured to:

determine whether to perform a threat prevention activity with regard to a network account of the user based on the user risk score for the user.

12. The system of claim 8, wherein the data associated with the network activity of each user of the plurality of users comprises categorical feature data associated with the network activity of each user of the plurality of users, and wherein, when generating the one or more entity feature embeddings for each user, the at least one processor is configured to:

generate one or more entity feature embeddings of the one or more entity feature embeddings for each user based on an output of a natural language processing (NLP) machine learning model, wherein the output is based on an input that comprises the categorical feature data associated with the network activity of that user.

13. The system of claim 8, wherein the at least one processor is further configured to:

generate data associated with a result of a static rule-based model for a user, wherein the result is determined based on the data associated with the network activity of the user provided as an input to the static rule-based model; and update the temporal GNN machine learning model based on the data associated with the result of the static rule-based model.

14. The system of claim 8, wherein, when receiving the data associated with the network activity of each user of the plurality of users during the time interval, the at least one processor is configured to:

receive data associated with a plurality of audit logs for each user of the plurality of users, wherein the plurality of audit logs are associated with the network activity of a user during the time interval;

wherein, when generating the one or more entity feature embeddings for each user, the at least one processor is configured to:

generate a plurality of entity feature embeddings for each user based on the data associated with the plurality of audit logs for that user, wherein each entity feature embedding of the plurality of entity feature embeddings corresponds to each audit log of the plurality of audit logs.

15. A computer program product comprising at least one non-transitory computer-readable medium including program instructions that, when executed by at least one processor, cause the at least one processor to:

receive data associated with network activity on a network of each user of a plurality of users during a time interval, wherein the data associated with the network activity of each user of the plurality of users during the time interval comprises:

data associated with:

accessing a program;

performing an action involving the program;

causing the action to be carried out by an application;

activating the program;

deactivating the program; or any combination thereof, and wherein the data associated with the network activity of each user of the plurality of users during the time interval comprises data associated with the network activity carried out by each user of the plurality of users for each data source of a plurality of data sources for network activity;

generate one or more entity feature embeddings for each user based on the data associated with the network activity of that user during the time interval;

generate a plurality of user behavior embeddings for the plurality of users based on one or more outputs of a temporal graph neural network (GNN) machine learning model, wherein each user behavior embedding comprises a representation of network activity of a user during the time interval, wherein the temporal GNN machine learning model was generated based on the one or more entity feature embeddings for each user of the plurality of users, and wherein time is incorporated as a feature in nodes or edge embeddings of the temporal GNN machine learning model; and calculate a user risk score for a first user based on the plurality of user behavior embeddings, wherein the user risk score represents a measurement of a risk associated with behavior of the first user to cause damage to the network.

16. The computer program product of claim 15, wherein the program instructions further cause the at least one processor to:

determine a plurality of peer groups for the plurality of users based on the plurality of user behavior embeddings; and determine, based on the plurality of peer groups for the plurality of users, at least one of the following:

a metric associated with a peer grouping of the first user;

a metric associated with behavioral anomalies of the first user;

a metric associated with one or more results of one or more static rule-based models for the user; or any combination thereof;

wherein, the program instructions that cause the at least one processor to calculate the user risk score for the user, cause the at least one processor to:

calculate the user risk score for the first user based on at least one of the following:

the metric associated with a peer grouping of the first user;

the metric associated with behavioral anomalies of the first user;

the metric associated with one or more results of one or more static rule-based models for the user; or any combination thereof.

17. The computer program product of claim 15, wherein the program instructions further cause the at least one processor to:

generate the temporal GNN machine learning model based on the one or more entity feature embeddings for each user of the plurality of users.

18. The computer program product of claim 15, wherein the program instructions further cause the at least one processor to:

determine whether to perform a threat prevention activity with regard to a network account of the user based on the user risk score for the user.

19. The computer program product of claim 15, wherein the data associated with the network activity of each user of the plurality of users comprises categorical feature data associated with the network activity of each user of the plurality of users, and wherein, the program instructions that cause the at least one processor to generate the one or more entity feature embeddings for each user, cause the at least one processor to:

generate one or more entity feature embeddings of the one or more entity feature embeddings for each user based on an output of a natural language processing (NLP) machine learning model, wherein the output is based on an input that comprises the categorical feature data associated with the network activity of that user.

20. The computer program product of claim 15, wherein the program instructions further cause the at least one processor to:

generate data associated with a result of a static rule-based model for a user, wherein the result is determined based on the data associated with the network activity of the user provided as an input to the static rule-based model; and update the temporal GNN machine learning model based on the data associated with the result of the static rule-based model.

* * * * *